Jan. 4, 1927.  1,613,061
F. S. SMITH
ART AND APPARATUS FOR WELDING TRANSFORMER TANKS
Filed Feb. 21, 1925

Franklin S. Smith  INVENTOR
BY Robert S. Blair
ATTORNEY

Patented Jan. 4, 1927.

1,613,061

UNITED STATES PATENT OFFICE.

FRANKLIN S. SMITH, OF BROOKLYN, NEW YORK, ASSIGNOR TO PRODUCTS PROTECTION CORPORATION, A CORPORATION OF DELAWARE.

ART AND APPARATUS FOR WELDING TRANSFORMER TANKS.

Application filed February 21, 1925. Serial No. 10,979.

This invention relates to a method and apparatus for welding a closure member onto a container, and more particularly to a method and apparatus for sealing by welding a transformer casing or tank.

One of the objects of this invention is to provide a simple and practical art and apparatus for welding a closure member, such as the head or end shell, to a container, such as a transformer tank. Another object is to provide a method of the above-mentioned character which may be rapidly and efficiently carried on in practice, and with thoroughly dependable results. Another object of this invention is to provide a method of the above-mentioned character for eliminating in a thoroughly reliable manner the production of oxides within the container or tank as the latter is closed or sealed. Another object is to provide a practical method for sealing a transformer within its casing or tank and preventing the production and retention in the tank of undesired oxides, such as magnetic oxide. Another object is to provide simple and thoroughly practical apparatus for carrying out the above-mentioned objects. Other objects will be in part obvious or in part pointed out hereinafter.

The invention accordingly consists in the features of construction, combinations of elements, arrangements of parts and in the several steps and relation and order of each of the same to one or more of the others all as will be illustratively described herein, and the scope of the application of which will be indicated in the following claims.

Figure 1:
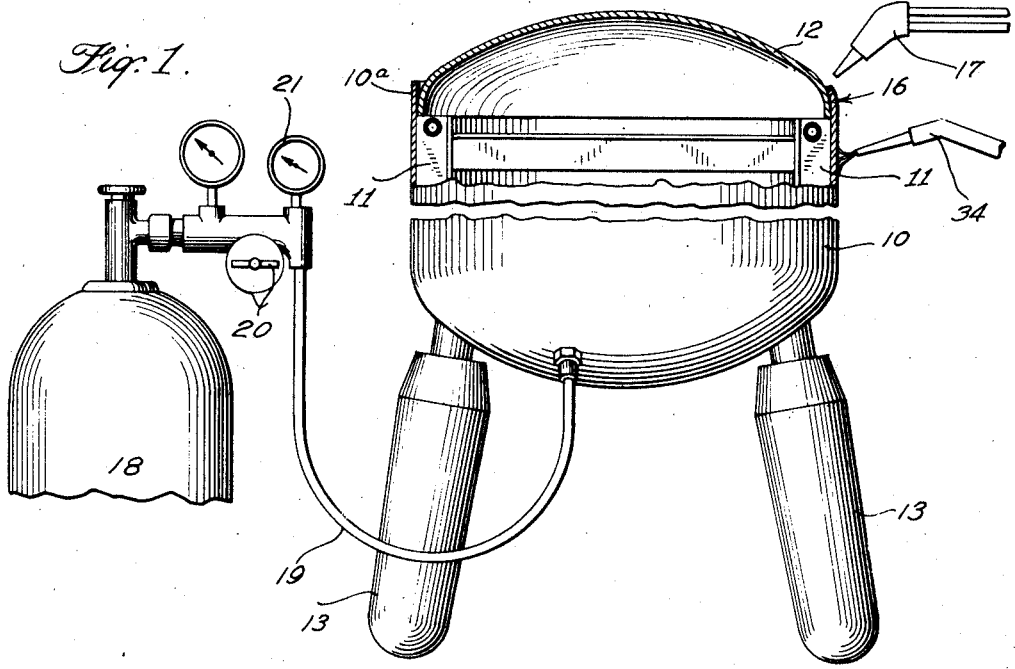
Figure 2:
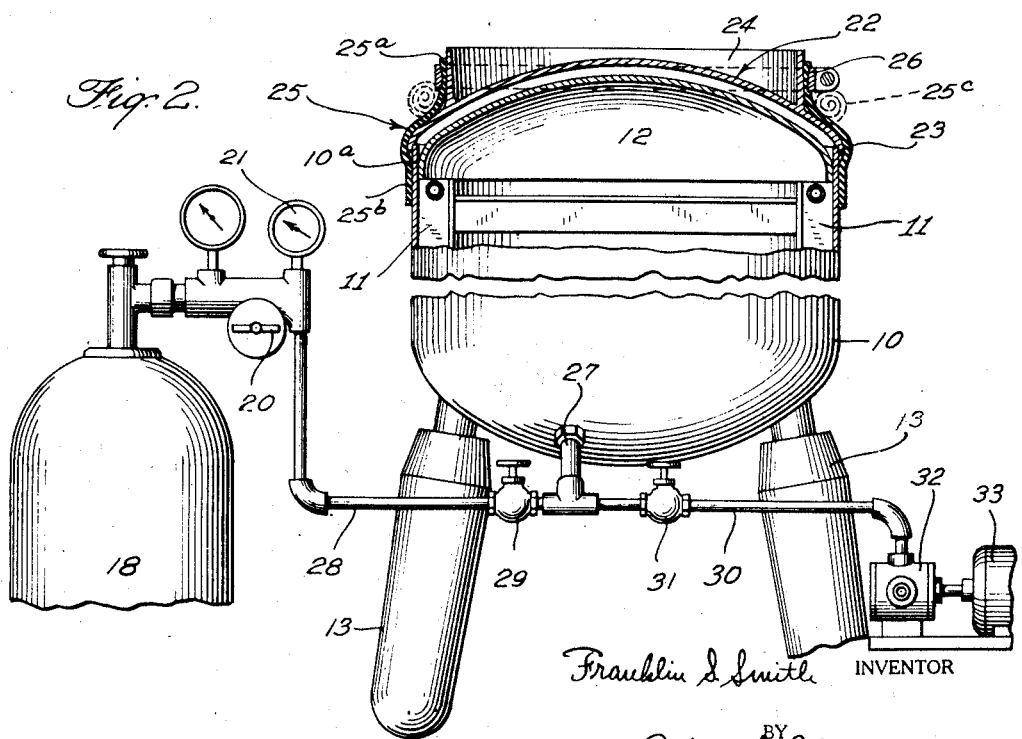

In the accompanying drawing, in which are shown certain mechanical features of this invention, Figure 1 is a side elevation of a transformer in inverted position, certain parts being shown in section and certain parts being broken away to show the construction more clearly, together with apparatus for carrying out certain features of this invention, and Figure 2 is a side elevation of a transformer in inverted position, certain parts being shown in section and others being broken away to show the construction more clearly, together with apparatus, part of which is shown in section, illustrative of a preferred mode of carrying out my invention.

Similar reference characters refer to similar parts throughout the several views in the drawing.

As conducive to a clearer understanding of this invention, it may at this point be noted that in certain types of transformer construction, particularly in high voltage transformers, it is peculiarly desirable to assemble the parts of the transformer casing or tank as by welding; but in such welding operations, there is produced a scale or oxide which, where the casing or tank is of steel, for example, as is generally the case, has magnetic properties. This scale or oxide, aside from having magnetic properties, also has relatively high electrical conductivity, and it may readily produce undesired and detrimental effects upon the intended or desired electrical characteristics of the transformer construction within the tank.

Particularly is this the case where, in certain types of high voltage transformer construction, certain portions of the windings, or even all of the windings, are bare and hence exposed within the tank. In such instances, and particularly where for insulation of the transformer parts there is employed a gaseous dielectric under high pressure, the lodging of loose scale on or within such portions of the transformer windings as are bare may readily produce results of serious consequence. A transformer construction of the above-mentioned type and as to which this invention is peculiarly adaptable is illustrated in my co-pending application. The gaseous dielectric in such a transformer may include a mixture in appropriate proportions of helium and nitrogen under a pressure of a number of atmospheres. To devise a method for sealing a transformer within its casing while avoiding the above mentioned detriments is among the dominant aims of this invention.

Turning now to the drawing and referring first to Figure 1, there is shown at 10 a transformer tank or casing within which is mounted the transformer core and windings in any suitable manner, for example, as shown in my above-mentioned application. In Figure 1 the transformer core is assumed to be of the shell type, and at 11 are shown vertically extending angle iron clamping bars for holding the core in assembled relation. These bars 11 with their related transformer core preferably snugly fit into the transformer casing or tank 10 and extend upwardly to within a short distance of the upper end portions 10ª of the main body portion of the transformer casing 10. The bars 11 thus conveniently form a shoulder upon the inside of the container 10 so as to receive thereon and hold against inward movement with respect to the tank 10 the closure member or end shell 12 of the container 10. Of the electrical parts of the transformer, the high tension terminals are indicated at 13.

Various component parts of the transformer casing or container may be welded together in the usual manner, it being noted that, as long as the one end of the container 10 is open, the interior parts of the welds thus formed may be readily sand-blasted to remove the undesired scale or magnetic oxide.

After such sand-blasting has taken place and the oxide thus removed, the parts of the transformer may be inserted within the container 10, as already above described, and the end closure member or shell 12 seated over the end opening of the container 10 to substantially close this opening. Thus, the end shell 12 may be seated upon the inner shoulder formed by the angle iron clamping bars 11, and the transformer construction is ready to have the operation of joining the closure member 12 to the container 10 proceeded with.

The end shell or closure member 12 will be seen to be substantially dome-shaped, and before the end shell 12 is to be welded to the upper end portion of the container 10, the upper end portion 10ª of the latter is first bent inwardly and over and upon the rim portions of the end shell 12, as is indicated at 16 in Figure 1. This bending operation is preferably carried on by first heating the part 10ª, as by the welding torch 17, and bending the part 10ª inwardly and completely about its periphery, as by hammering. After the bending operation has been performed, the welding of the parts together may be proceeded with.

In order to preclude the production of scale or magnetic oxide, there is maintained at the particular point or points where the parts are heated, both during the bending operation or during the welding, an atmosphere free from oxygen so that the possibility of producing an oxidation of the heated steel or iron of the parts is effectively prevented. This atmosphere free from oxygen at the heated point or points I may achieve and maintain in substantially the following manner:—

Inasmuch as the production of magnetic oxide at those portions of the joint between the closure member 12 and the container 10 which are upon the interior of these parts is primarily to be precluded, I first replace the oxygen bearing air within the substantially closed container 10 by an agent which, at the temperatures to which the parts are to be heated, is non-oxidizing; this agent may take the form of one of the so-called noble gases, or a gaseous mixture, but preferably takes the form of a gas such as nitrogen, the latter having certain desirable advantages. This non-oxidizing agent which, as above noted, conveniently takes the form of nitrogen, I designate as an inert gas, and by this designation it is to be understood that there is intended to be included an agent which, at the temperature or temperatures to which the parts are heated, is non-oxidizing. This replacement of the air within the container 10 may be brought about by charging the container with inert gas, preferably nitrogen, as from a suitable flask 18 connected to a bottom portion of the container 10 by the pipe 19. A suitable hand-controlled valve 20 is interposed between the flask 18 and the pipe 19, and to the pipe 19 is connected a pressure gage 21 for indicating the pressure of the gas flowing into the container 10.

The charging of the container 10 with nitrogen causes the exit of the air within the container 10 through the incomplete joint between the closure member 12 and the container 10, and the flow of nitrogen into the container 10 is preferably continued until substantially only inert gas escapes through the incomplete joint. The air having been thus substantially removed from the container 10 the welding torch 17 is then applied to the upper edge portion 10ª of the container 10, and this upper edge portion 10ª is heated sufficiently to permit it to be bent inwardly, as by hammering, for example, inwardly and over and upon the rim portions of the end shell 12, as is indicated at 16 in Figure 1. This edge portion 10ª will be understood to be bent inwardly throughout its entire periphery. But during the bending operation, during which it will be understood that the upper edge portion is maintained in heated condition at the point of bending, the flow of inert gas or nitrogen through the incomplete joint between the end shell 12 and the container 10 and past the inner surface of the upper edge portion 10ª is maintained so as to preclude an oxidation of the heated part with consequent formation of oxide from taking place.

The continued flow of inert gas or nitrogen into the container 10, as above described, has brought about a substantially complete elimination of oxygen bearing air within the container, it being pointed out that the continued addition of nitrogen to the content of the container 10 and the removal of the nitrogen and admixed air from the container causing a progressive diminution of oxygen bearing air within the container until practically only nitrogen is contained therein. But the bending over of the upper edge portion 10ª of the container 10 during this continued escape but now only of inert gas or nitrogen, has resulted in more closely uniting mechanically the closure member 12 to the container 10, inasmuch as the leakage orifice between these parts has been materially cut down. The welding torch 17 may then be applied, substantially as indicated in Figure 1, to heat the contiguous parts to welding temperature and to weld the parts together, but during the welding, the flow of inert gas or nitrogen into the container 10 and its escape through the incomplete joint is continued, but now at a decreased rate (which may be controlled by the valve 20) because of the cutting down of the leakage orifice between the closure member 12 and the container 10, due to the bending over of the upper edge portion 10ª. Thus there is maintained at the point of welding an atmosphere incapable of causing oxidation of the metal at the welding temperature and thus the production of oxide is precluded.

As the welding proceeds about the periphery of the joint, the flow of inert gas into the container 10 and its resultant escape through the joint undergoing completion or welding is gradually reduced, but the pressure of inert gas within the container 10 is, during the welding operation, maintained slightly above atmospheric pressure, as by means of the valve 20. The pressure of inert gas within the container 10 may thus be adjusted as the welding approaches completion to maintain an adequate flow of inert gas past the point of welding and through the unwelded part of the joint, to prevent entry of air into the container 10. During the welding operation, the rate of flow of inert gas through the incomplete joint, to prevent entry of air to the container and to maintain the inner surface or surfaces of the parts to be welded in an atmosphere incapable of causing oxidation, is relatively much less after the part 10ª has been bent over the rim portion of the closure member 12, since the orifice available for the escape of nitrogen has been substantially correspondingly decreased, and the now closely adjacent surfaces of the part 10ª and the member 12 insure the contact of escaping inert gas with the heated parts and at which parts oxides would otherwise form. The welding having been completed, the pipe 19 may be disconnected from the container 10 and the transformer casing is now ready to be charged with any suitable dielectric and in any suitable manner.

To achieve greater economy in the expenditure of inert gas, and greater speed of operation, particularly in cases where an inexpensive source of supply of such inert gas is not readily available, I prefer to carry on the welding of the closure member 12 to the transformer casing 10 in the following manner and by means of apparatus illustratively shown in Figure 2. After the transformer parts have been assembled, as already hereinbefore described, and after the closure member 12 has been seated in substantially closing position with respect to the open end of the transformer container 10, there is seated upon the container 10 and over the closure member 12 a substantially dome-shaped cap 22, of rigid construction and preferably metallic; this cap member 22 is preferably shaped so as to engage the upper end portion 10ª of the shell 10, and very conveniently may be recessed or bezeled as at 23 to receive therein the upper end of the container 10. Integrally formed with the cap member 22 is an upwardly directed flange 24, and to this flange 24 is secured the upper end 25ª of a skirt-like yieldable member 25, conveniently made of rubber, and of such an extent that its lower end 25ᵇ may be extended over the lower end portion of the cap member 22 and the upper end portion of the container 10. The upper end 25ª of this flexible or yieldable member 25 may be secured in fluid-tight relation to the cap member 22 as by means of the clamping ring 26 by means of which the upper end 25ª of the skirt-like member 25 may be securely clamped against the flange 24. With the member 25 in the position shown in full lines in Figure 2, the joint between the cap member 22 and the container 10 will be seen to be overlapped by the member 25.

Connected to the lower end of the container 10 is a pipe 27 which has two branches; one branch 28, with a valve 29 therein, leads to the flask 18 with the regulating valve 20 and gage 21 associated therewith and the other branch 30, with a valve 31 therein leads to a pump 32 operated from any suitable source of energy, such as the motor 33. To replace the air content of the container 10 with inert gas, such as nitrogen from the flask 18, the valve 29 is closed and the valve 31 opened; the pump 32 upon being placed in operation exhausts the oxygen bearing air to as great an extent as possible or desirable from the container 10. During this exhausting action of the pump 32, the skirt member 25 securely seals the connection between the cap member 22 and the container 10 and prevents ingress of air to the container. The valve 31 is thereupon closed and the valve 29 opened, and by means of the regulating valve 20 the container is charged to any desired extent with inert gas or nitrogen from the flask 18. This charge of nitrogen within the container 10 intermingles with the residue of air in the container 10 which the pump 32 has been unable to remove, and upon a subsequent closure of the valve 29 and an opening of the valve 31, this mixture of inert gas and oxygen bearing air is removed. This cycle of operation may be repeated as many times as desired, it being noted that the oxygen content of the container 10 is progressively decreased and may, quite readily, be made of such a slight amount as to be inconsequential. The container 10 is thereupon charged with inert gas from the flask 18 to a pressure substantially slightly greater than atmospheric, whereupon the joint between the cap member 22 and the container 10 may be unsealed as by rolling up the skirt member 25 into the dotted line position indicated at 25ᶜ. The cap member 22 with its associated parts may thereupon be removed.

The welding torch such as the torch 17 of Figure 1 may thereupon be applied to heat the upper edge portion 10ᵃ of the container 10 to permit it to be bent inwardly and over the closure member or end shell 12, as indicated at 16 in Figure 1, whence the welding of the parts may be proceeded with. The valve 31 remains closed and the valve 29 open; the pressure of inert gas or nitrogen within the container 10 may be maintained, by means of the regulating valve 20, at a value sufficiently above atmospheric so as to insure the maintenance adjacent the parts that are heated for bending and adjacent the point of welding of an atmosphere free from oxygen, and to prevent entry of air from the exterior to the heated parts; as the welding of the joint between the closure member 12 and the container 10 proceeds and approaches completion, the pressure of the inert gas of the container 10 may be gradually decreased, all as will be clear from the operations already described in connection with Figure 1. Thus, the oxygen bearing air content of the container 10 may be more economically and speedily replaced by inert gas, and by insuring the escape of inert gas through the incomplete joint between the closure member 12 and the container 10 as these parts are heated for the bending of one over the other and then progressively welded together, the entry of oxygen to the point of heating or of welding is effectively precluded, and hence the formation of the undesired magnetic oxide prevented.

As the heating or welding proceeds, a jet of water supplied through the nozzle 34 (see Fig. 1) may be directed to the lower parts of the transformer casing to prevent overheating of these portions and parts of the transformer contacting therewith.

It will thus be seen that there has been provided in this apparatus a thoroughly practical art and apparatus for welding the closure member onto a container, and that the art provided may be inexpensively and conveniently carried on in practice, all with the attainment of many advantages. The formation of magnetic oxide upon the interior of the transformer casing and its attendant detrimental effects are effectively avoided, and it will be seen that at the same time there is produced a transformer casing capable of withstanding the necessary high pressures of gaseous dielectric and without loss thereof.

As many possible embodiments may be made of the mechanical features of the above invention and as the art herein described might be varied in various parts all without departing from the scope of the invention, it is to be understood that all matter herein set forth or shown in the accompanying drawings is to be interpreted as illustrative and not in a limiting sense.

I claim as my invention:

1. The method of welding a closure member onto a container which consists in seating the closure member over the opening of said container, replacing the air content of the container by an inert gas, bending the wall of the container adjacent the closure over and upon the rim portion of the closure member, and welding contiguous portions of the closure member and the container.

2. The method of welding a closure member onto a container which consists in seating the closure member over the opening of said continer, replacing the air content of the container by an inert gas, bending the wall of the container adjacent the closure over and upon the rim portion of the closure member, maintaining a pressure of the inert gas in the container sufficient to cause the gas to escape through the incomplete joint between the closure member and the container, and welding the closure member to the container.

3. The method of welding a closure member onto a container which consists in seating the closure member over the opening of said container, replacing the air content of the container by an inert gas, bending the wall of the container adjacent the closure over and upon the rim portion of the closure member, maintaining a pressure of the inert gas in the container sufficient to cause the gas to escape through the incomplete joint between the closure member and the container, progressively welding the parts of the joint between the closure member and the container, and cutting down the pressure of the inert gas in the container as the welding of the closure to the container proceeds.

4. The method of welding a closure member onto a container which consists in seating the closure member in closing position with respect to the opening of the container to be closed, replacing the air content of the container by an inert gas, causing gas to escape through the incomplete joint between said closure member and the container by supplying inert gas to the container, and welding together the parts of said incomplete joint as the gas escapes therethrough.

5. The method of welding a closure member onto a container which consists in seating the closure member in closing position with respect to the opening of the container to be closed, replacing the air content of the container by an inert gas, causing the gas to escape through the incomplete joint between said closure member and the container by supplying inert gas to the container, progressively welding together the parts of said incomplete joint between the member and said container as the gas escapes therefrom, and cutting down the flow of inert gas as the welding proceeds.

6. The method of welding a closure member onto a container which consists in seating the closure member on the container so as to substantially close the opening in the latter, sealing the incomplete joint between said closure member and said container against ingress of air into the container, exhausting air from within said container, charging the container with an inert gas, exhausting the content of said container, re-charging said container with inert gas, and welding together the parts of said incomplete joint between said closure member and said container.

7. The method of welding a closure member onto a container which consists in seating the closure member on the container so as to substantially close the opening in the latter, sealing the joint between said closure member and said container against ingress of air into the container, exhausting air from within said container, charging the container with an inert gas, exhausing the content of said container, re-charging said container with inert gas, unsealing the incomplete joint between said member and said container to permit inert gas to escape therethrough, and welding the closure member to the container.

8. The method of welding a closure member onto a container which consists in seating the closure member on the container so as to substantially close the opening in the latter, sealing the joint between said closure member and said container against ingress of air into the container, exhausting air from within said container, charging the container with an inert gas, exhausting the content of said container, re-charging said container with inert gas, unsealing said incomplete joint between the closure member and the container, raising the pressure of the inert gas within the container to cause it to escape through said incomplete joint, and welding the container to the closure member.

9. The method of welding a closure member onto a container which consists in seating the closure member on the container so as to substantially close the opening in the latter, sealing the joint between said closure member and said container against ingress of air into the container, exhausting air from within said container, charging the container with an inert gas, exhausting the content of said container, re-charging said container with said inert gas, unsealing said incomplete joint between the closure member and the container, raising the pressure of the inert gas within the container to cause it to escape through said incomplete joint, progressively welding the closure member to the container, and cutting down the pressure of inert gas in said container as the welding proceeds.

10. The method of welding a closure member onto a container which consists in seating the closure member in closing relation to the opening in the container but held against inward movement with respect to the container, sealing the joint between the closure member and the container against ingress of air into the container, replacing the air within the container by an inert gas, and welding the closure member to the container.

11. The method of welding a closure member onto a container which consists in seating the closure member in closing relation to the opening in the container but held against inward movement with respect to the container, sealing the joint between the closure member and the container against ingress of air into the container, exhausting the air from the container, charging the container with an inert gas, unsealing the incomplete joint between the closure member and the container, and welding the closure member to the container.

12. The method of welding a closure member onto a container which consists in seating the closure member in closing relation to the opening in the container but held against inward movement with respect to the container, sealing the joint between the closure member and the container against ingress of air into the container, exhausting the air from the container, charging the container with an inert gas, unsealing the incomplete joint between the closure member and the container, welding together the parts of said incomplete joint, supplying inert gas to said container at a rate sufficient to cause inert gas to escape through said incomplete joint in the course of the welding of the parts thereof.

13. The method of welding a closure member onto a container which consists in seating the closure member in closing relation to the opening in the container but held against inward movement with respect to the container, sealing the joint between the closure member and the container against ingress of air into the container, exhausting the air from the container, charging the container with an inert gas, unsealing the incomplete joint between the closure member and the container, welding together the parts of said incomplete joint between the closure member and the container, and maintaining a pressure of inert gas within the container greater than atmospheric during the welding of the said parts.

14. The method of joining a closure member to a container which consists in seating the member upon the container in closing relation thereto, replacing the air content of the container by a fluid non-oxidizing agent, and welding the member to the container.

15. The method of joining a closure member to a container which consists in seating the member upon the container in closing relation thereto, replacing the air content of the container by an inert gas, and welding the member to the container.

16. The method of closing a transformer casing with the transformer parts therein, which consists in seating the closure member upon the casing in closing relation thereto, replacing the air content of the casing by nitrogen, and welding the member to the container.

17. The method of joining a closure member to a container which consists in seating the closure member over the opening of said container, welding the member to the container, and maintaining within the container at the point of welding and during the welding operation an atmosphere free from oxygen.

18. The method of joining a closure member to a container which consists in seating the closure member over the opening of said container, interlocking mechanically the member with the container, welding the member to the container, and maintaining within the container at the point of welding and during the welding operation an atmosphere free from oxygen.

19. The method of joining a closure member to a container which consists in seating the closure member over the opening of said container, welding the member to the container, and maintaining past the point of welding and during the welding operation a flow of inert gas.

20. In apparatus of the character described, in combination, a container having a closure member seated in closing relation with respect to an opening in the container, means for exhausting the gaseous content of said container, and means for sealing said container against ingress of air into the container including a yieldable sheet-like member arranged to be held by atmospheric pressure against the juncture between said closure member and said container.

21. In apparatus of the character described, in combination, a container having a closure member seated in closing relation with respect to an opening in the container; means for exhausting the gaseous content of said container; and means for sealing said container against ingress of air into the container including a rigid member arranged to be seated upon the container but over the closure member thereof, and means for sealing the connection between said rigid member and the container.

22. In apparatus of the character described, means for temporarily sealing a container having a closure member seated in closing relation with respect to an opening in the container and against ingress of air into the container, comprising, in combination, a rigid member arranged to be seated upon the container but over said closure member and provided with a yieldable skirt-like extension adapted to be held in fluid-tight contact with the container by atmospheric pressure.

23. In apparatus of the class described, means for temporarily sealing a container with the head seated in closing relation with respect to the end of the container comprising, in combination, a cap adapted to be seated against the container and over the head thereof, and yieldable means seated over the joint between said cap and the container and arranged to be held in sealing position by atmospheric pressure.

24. In apparatus of the class described, means for temporarily sealing a container with the head seated in closing relation with respect to the end of the container comprising, in combination, a cap adapted to be seated against the container and over the head thereof, and a flexible tube-like member in fluid-tight connection with said cap and arranged to overlap said container.

25. In apparatus of the class described, means for temporarily sealing a container with the head seated in closing relation with respect to the end of the container comprising, in combination, a cap adapted to be seated against the container and over the head thereof, and a rubber tube-like member in fluid-tight connection with said cap and adapted to overlap the joint between said cap and said container.

26. In apparatus of the class described, means for temporarily sealing a container having a closure member seated in closing relation with respect to an opening in the container and against ingress of air into the container, comprising, in combination, a rigid member arranged to be seated upon the container but over said closure member, a yieldable skirt-like extension for said rigid member arranged at one end thereof to overlap the joint between the rigid member and the container, and means for holding said skirt-like extension at the other end thereof in fluid-tight contact with said rigid member.

27. The method of welding a closure member onto a container which consists in seating the closure member over the opening of said container, heating the edge portion of one of said members and bending said edge portion over the other of said members, welding the said members together, and maintaining at the heated parts and interiorly of the container an atmosphere free from oxygen.

28. The method of welding a closure member onto a container which consists in seating the closure member over the opening of said container, replacing the air content of the container by an inert gas, heating and bending the wall of the container adjacent the closure over and upon the rim portion of the closure member, welding contiguous portions of the closure member and the container, and maintaining at the heated parts and interiorly of the container an atmosphere free from oxygen.

In testimony whereof, I have signed my name to this specification this 19th day of February, 1925.

FRANKLIN S. SMITH.